US012679941B2

(12) United States Patent
Liu et al.

(10) Patent No.: US 12,679,941 B2
(45) Date of Patent: Jul. 14, 2026

(54) ANTI-AGING PIPE

(71) Applicant: JiangShan HongJing Machinery Co., Ltd, Qu Zhou City (CN)

(72) Inventors: Ying Liu, Qu Zhou City (CN); HaiZhong Weng, Qu Zhou City (CN)

( * ) Notice: Subject to any disclaimer, the term of this patent is extended or adjusted under 35 U.S.C. 154(b) by 547 days.

(21) Appl. No.: 18/315,449

(22) Filed: May 10, 2023

(65) Prior Publication Data

US 2024/0376279 A1     Nov. 14, 2024

(51) Int. Cl.
| | |
|---|---|
| *B32B 1/08* | (2006.01) |
| *B32B 27/18* | (2006.01) |
| *B32B 27/30* | (2006.01) |
| *B32B 27/40* | (2006.01) |
| *C08J 7/04* | (2020.01) |
| *C08K 3/22* | (2006.01) |
| *C08L 27/06* | (2006.01) |
| *C08L 75/04* | (2006.01) |

(52) U.S. Cl.
CPC .............. *C08J 7/0423* (2020.01); *C08K 3/22* (2013.01); *C08L 27/06* (2013.01); *C08L 75/04* (2013.01); *C08J 2327/06* (2013.01); *C08J 2375/04* (2013.01); *C08K 2003/221* (2013.01); *C08K 2201/005* (2013.01); *C08L 2201/08* (2013.01); *C08L 2203/18* (2013.01)

(58) Field of Classification Search
None
See application file for complete search history.

(56) References Cited

U.S. PATENT DOCUMENTS

2023/0407045 A1 * 12/2023 Williams ................. C08K 3/22

FOREIGN PATENT DOCUMENTS

| CN | 102767648 A | * | 11/2012 | |
|---|---|---|---|---|
| CN | 105906981 A | * | 8/2016 | .............. C08L 27/06 |
| CN | 114909529 A | * | 8/2022 | ............... B32B 3/12 |

OTHER PUBLICATIONS

Machine translation of CN-102767648-A (no date).*
Machine translation of CN-105906981-A (no date).*
Abstract of CN-114909529-A (no date).*

* cited by examiner

*Primary Examiner* — Michael J Feely
(74) *Attorney, Agent, or Firm* — Tsz Lung Yeung

(57) ABSTRACT

An anti-aging pipe includes an anti-aging layer and a transmission channel, wherein the anti-aging layer is prepared by mixing a pipe matrix material and a rare earth material, the mass proportion of the rare earth material is not more than 40%, and the anti-aging pipe has good tensile strength performance and compressive strength performance and good anti-aging performance.

14 Claims, 7 Drawing Sheets

1

ANTI-AGING PIPE

BACKGROUND OF THE PRESENT INVENTION

Field of Invention

The present invention relates to the field of transmission, and more particularly to an anti-aging pipe.

Description of Related Arts

A pipeline is a common transmission tool in daily life and can be used for transmitting materials such as gas, liquid or gas-liquid mixture and the like. The types of pipelines are various, the selectable range of manufacturing materials is very wide, and the current commonly used materials comprise PVC, PP and the like.

The performance of the pipeline plays a great role in the whole pipeline transportation process, and the pipeline with excellent performance can be suitable for changeable application environments. However, the problem of performance reduction of a general pipeline can occur along with the prolonging of the service life. Aging is a critical factor affecting the life of the pipeline.

According to different application scenes, pipelines can be mainly divided into two types, wherein one type is an underground pipeline, and the other type is an above-ground pipeline. The problem of aging is more pronounced for the above ground pipes, since they are more susceptible to light radiation. At present, two main solutions are provided, one is to enhance the performance of the pipeline by changing the structure of the pipeline, so as to relieve the performance reduction problem caused by aging, and the other is to adopt a new anti-aging material to manufacture the pipeline. The application of the former solution to enhance the aging resistance of the pipeline puts forward high requirements for the manufacture of the pipeline, which may involve the change of the entire production equipment, and the application is limited. The latter solution may have a problem in that the aging resistance of the pipe may be improved by the addition of an aging resistant material, but the original properties of the pipe, such as strength, may be affected. In other words, when using anti-aging materials to enhance one of the properties of the pipe, it is necessary to consider whether it will adversely affect the other properties of the pipe

SUMMARY OF THE PRESENT INVENTION

An advantage of the present invention is to provide an anti-aging pipe, which has good absorption performance for ultraviolet wavelength, especially for ultraviolet wavelength around 350 nm, by using specific rare earth materials, so as to delay material failure caused by ultraviolet irradiation in daily use of products, prolong the service life of the products, and simultaneously enhance the anti-aging performance and strength performance of the anti-aging pipe.

Another advantage of the present invention is to provide an anti-aging pipe, wherein the anti-aging pipe has a simple manufacturing method and is suitable for industrial large-scale application.

Another advantage of the present invention is to provide an anti-aging pipe, wherein the material for manufacturing the anti-aging pipe can be selected from various materials, such as polyethylene, polyvinyl chloride, polyurethane, polypropylene, etc.

Another advantage of the present invention to provide an anti-aging pipe, wherein the entire pipe of the anti-aging pipe can be made anti-aging.

Another advantage of the present invention is to provide an anti-aging pipe, wherein the anti-aging pipe comprises an outer hose and an inner hose, wherein the outer hose is coated outside the inner hose, and the outer hose can be designed to have good anti-aging performance.

Another advantage of the present invention is to provide an anti-aging pipe, wherein the anti-aging pipe includes an anti-aging layer and a reinforcing layer, wherein the anti-aging material is attached to a surface of the reinforcing layer to form the anti-aging layer, the reinforcing layer can enhance the strength of the pipe, and the anti-aging layer can enhance the anti-aging performance and the strength performance of the pipe.

According to an aspect of the present invention, the present invention provides an anti-aging pipe, wherein the anti-aging pipe comprises an anti-aging layer and has a transmission channel, wherein the anti-aging layer is made by mixing a pipe matrix material and a rare earth material, wherein the mass ratio of the rare earth material does not exceed 40%.

According to an embodiment of the present invention, the anti-aging pipe further includes a reinforcing layer, wherein the anti-aging layer is integrally coated on the reinforcing layer and the reinforcing layer is provided in a mesh structure to reinforce the strength of the anti-aging pipe.

According to one embodiment of the invention, the anti-aging pipe comprises an outer hose and an inner hose, the anti-aging layer forms the outer hose, the inner hose defines the transmission channel, and the outer hose is sleeved on the inner hose.

According to an embodiment of the present invention, the anti-aging pipe further includes a reinforcing layer, wherein the reinforcing layer is disposed between the outer hose and the inner hose.

According to an embodiment of the present invention, the anti-aging pipe further includes a reinforcing layer, wherein the inner hose is integrally wrapped around the reinforcing layer.

According to an embodiment of the present invention, the anti-aging pipe further includes a reinforcing layer, wherein the outer hose is integrally wrapped around the reinforcing layer.

According to an embodiment of the invention, the anti-ageing pipe is a flexible pipe.

According to an embodiment of the present invention, the anti-aging pipe is a polyvinyl chloride pipe or a polyurethane pipe.

According to an embodiment of the invention, the rare earth material is selected from one of the $La_2O_3$, $CeO_2$, $Pr_6O_{11}$, $Nd_2O_3$, $Sm_2O_3$, $Eu_2O_3$ and $SrAl_2O_4$.

According to an embodiment of the invention, the pipe matrix material is selected from one of polyamide fibers, nylon (PA) and nylon-based synthetic fibers, PVC polyvinyl chloride, PUR polyurethane, EPDM ethylene-propylene-diene monomer, NBR acrylonitrile butadiene copolymer/nitrile, CR neoprene, UPE/XLPE cross-linked polyethylene, UPE ultra high molecular weight polyethylene, Polyurethane (PU), polyethylene Plastic (PE), acrylonitrile-butadiene-styrene copolymer (ABS), unplasticized polyvinyl chloride (UPVC), post chlorinated polyvinyl chloride (CPVC), polypropylene (PP), polyvinylidene fluoride (PVDF), wherein the rare earth material is mixed in the pipe matrix material and the particle size of the rare earth material is 1 μm-50 μm.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Figure 1A:
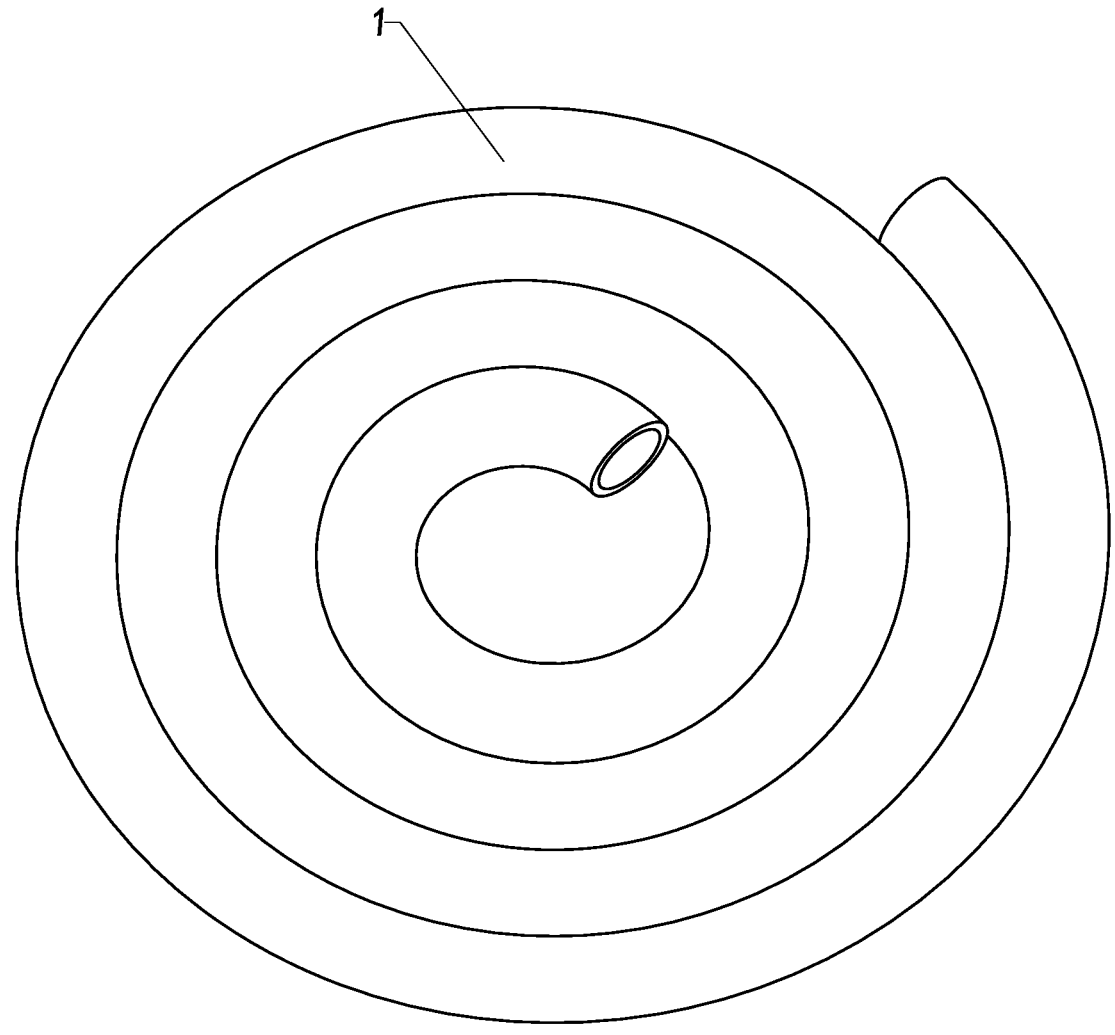
FIG. 1A is a schematic view of an anti-aging pipe according to a preferred embodiment of the present invention.
Figure 1B:
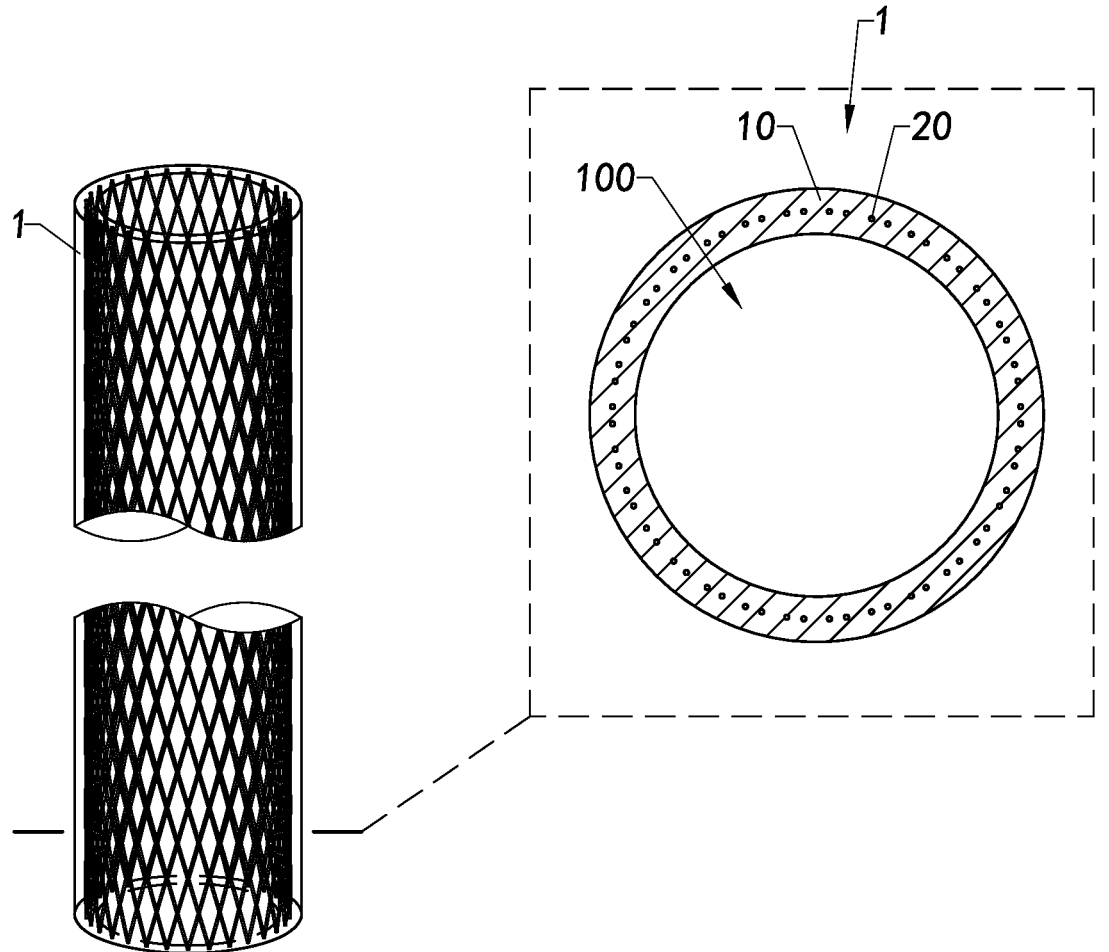
FIG. 1B is an another schematic view of the anti-aging pipe according to the above preferred embodiment of the present invention.

Referring to FIGS. 1A and 1B, an anti-aging pipe 1 according to a preferred embodiment of the present invention is illustrated, wherein the anti-aging pipe 1 has good anti-aging performance and good strength performance. In detail, the anti-aging pipe 1 includes an anti-aging layer 10 and a reinforcing layer 20, wherein the anti-aging layer 10 is made of an anti-aging material, the anti-aging layer 10 and the reinforcing layer 20 are integrally formed, and the reinforcing layer 20 is covered by the anti-aging layer 10. The reinforcing layer 20 mainly functions to reinforce the strength of the anti-aging pipe 1.

It is understood that the anti-aging pipe 1 may be a rigid pipe or a flexible pipe, and in this embodiment, the anti-aging pipe 1 is a flexible pipe. The anti-aging material is formed by mixing a pipe matrix material with a rare earth material.

The pipe matrix material may be selected from any one of the following materials: polyamide fibers, nylon (PA) and nylon-based synthetic fibers, PVC polyvinyl chloride, PUR polyurethane, EPDM, NBR acrylonitrile butadiene copolymer/nitrile, CR neoprene, UPE/XLPE cross-linked polyethylene, UPE ultra high molecular weight polyethylene, Polyurethane (PU), polyethylene Plastic (PE), acrylonitrile butadiene styrene copolymer (ABS), unplasticized polyvinyl chloride (UPVC), post chlorinated polyvinyl chloride (CPVC), polypropylene (PP), polyvinylidene fluoride (PVDF).

The rare earth material can be a rare earth oxide material, a rare earth salt material, a rare earth metal material or a mixture of the rare earth oxide material, the rare earth salt material and the rare earth metal material.

By way of example, the rare earth material may be selected from $SrCO_3$ (Strontium Carbonate) and $Dy_2O_3$ Dysprosium Oxide and $Er_2O_3$ (Erbium Oxide) and $Nd_2O_3$ (Neodymium Oxide), $Y_2O_3$ (Yttrium Oxide), $Eu_2O_3$ (Europium Oxide) $BaMg_2Al_{16}O_{27}$, $Ce_{0.67}Tb_{0.33}Al_{11}O_{19}$, $CeMgAl_{11}O_{19}$, $LaPO_4$, $Y_2SiO_5$, $ReMg_5BO_{10}$ and $SrAl_2O_4$ one or more of them.

For example, the rare earth element may be one selected from lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc), and yttrium (Y).

The preparation process of the anti-aging pipe 1 can be as follows: firstly, rare earth materials are mixed into a pipe matrix material, the rare earth materials and the pipe matrix material are in a fluid state or a molten state at a certain temperature, and then the anti-aging layer 10 coated with the reinforcing layer 20 is integrally formed outside the reinforcing layer 20, wherein the mass proportion of the rare earth materials is not more than 40%.

The preparation of the anti-aging layer 10 of the anti-aging pipe 1 is very simple, and only a pipe matrix material and a rare earth material need to be simply mixed on the basis of the original pipe manufacturing. It is understood that a person skilled in the art may control the timing of mixing the rare earth material and the pipe matrix material as required, and then make the pipe matrix material and the rare earth material mixed with each other form the anti-aging layer 10 of the anti-aging pipe 1 under certain conditions.

It is worth mentioning that the requirement of the anti-aging pipe 1 on the mixing uniformity of the pipe matrix material and the rare earth material is not high, and the two materials can be simply mixed. When the mixing uniformity of the rare earth material and the pipe matrix material is good, the rare earth material is distributed on the outer wall, the inner part and the inner wall of the anti-aging layer 10.

The reinforcing layer 20 may be prepared in advance, and may be a net structure made of metal or other materials, such as high-strength fibers, so that the structural strength of the anti-aging layer 10 can be enhanced.

The anti-aging pipe 1 is formed with a transmission channel 100, and the transmission channel 100 extends from one end of the anti-aging pipe 1 to the other end to penetrate through the anti-aging pipe 1, wherein materials can be transmitted through the transmission channel 100. The reinforcing layer 20 may be coated with the anti-aging layer 10 so as not to be in direct contact with the contents of the transmission passage 100, to reduce damage of the reinforcing layer 20 made of metal by corrosive contents. In other words, the anti-aging layer 10 of the anti-aging pipe 1 may also play a role of protection for the reinforcing layer 20.

Figure 3:
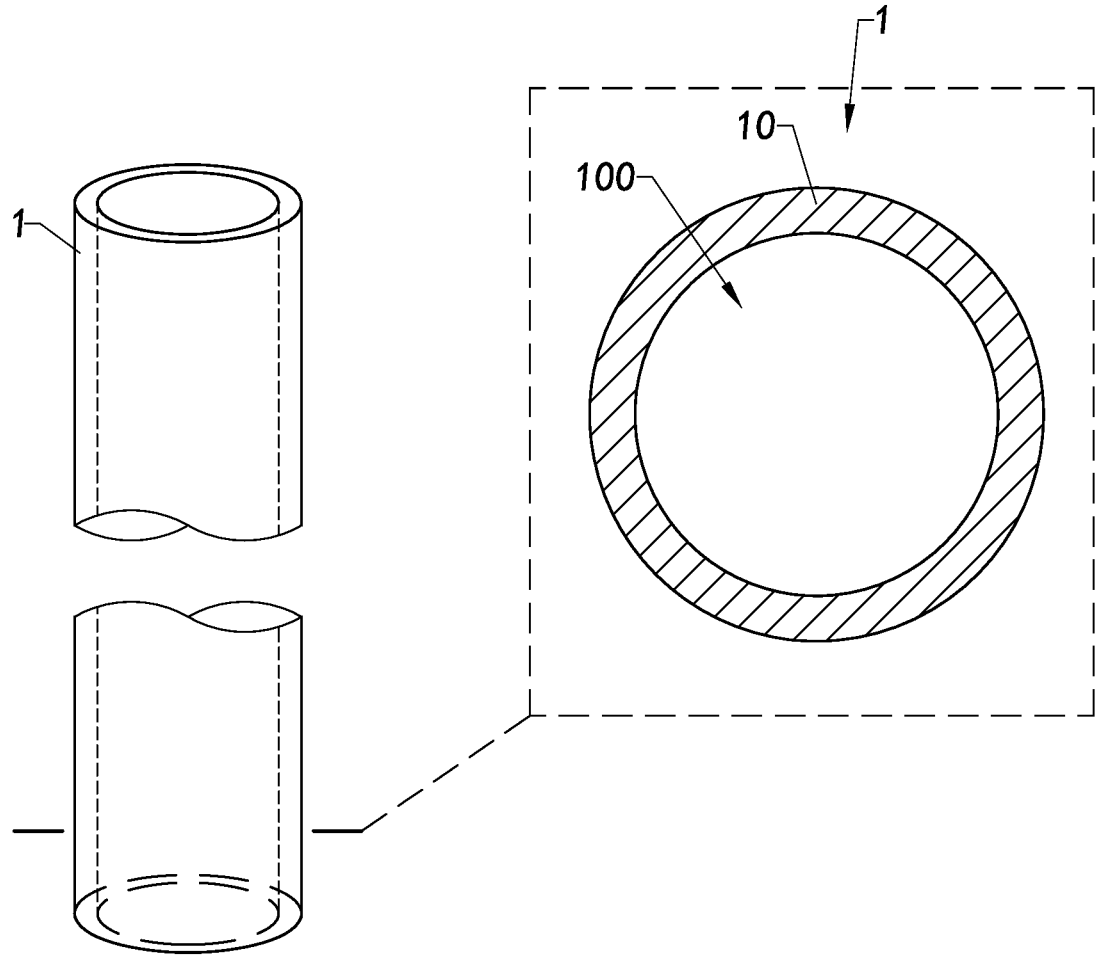
FIG. 3 is a schematic view of an anti-aging pipe according to another preferred embodiment of the present invention.

It is understood that the anti-aging pipe 1 may not include the reinforcing layer 20, that is, the entire anti-aging pipe 1 may be directly made of a pipe matrix material and a rare earth material, as shown in FIG. 3.

Further, the tensile test was performed with the anti-aging pipe 1 made of PU as a test object, wherein the pipe matrix material of the anti-aging pipe 1 is a polyurethane material, that is, a polyurethane material, wherein the rare earth material of the anti-aging pipe 1 is $SrAl_2O_4$ Eu-2+ and Dy-3+ of the rare earth salt have the functions of protecting the rare earth salt and promoting the absorption of ultraviolet rays.

The test procedure is roughly as follows: samples of 25 cm length with connectors at both ends are prepared and the pipe samples are then mounted on a tensile tester which is opened and the tension is gradually increased until the pipe breaks and the relevant value is recorded. All tests are completed at normal room temperature of 25° C., the particle size of the rare earth material added in the experimental group can be 1-50 μm, and the rare earth with the specification of 7 μm is added in the test. The PU pipe has a single-layer structure, and has an inner diameter of 6.35 mm and an outer diameter of 8.35 mm.

The test results are shown in the following table, wherein test group a is a control group to which the anti-aging material was not added, and wherein test group Aa is a test group to which the anti-aging material was added.

A-1-1, a-1-2, a-1-3 (non-UV-irradiated group), a-2-1, a-2-2, a-2-3 (UV-irradiated 2000-hour group), and a-3-1, a-3-2, a-3-3 (UV-irradiated 4000-hour group) in comparative test group A revealed that UV had a greater effect on the tensile strength of the pipe. The influence of the tensile strength of the pipe subjected to the ultraviolet irradiation is remarkably reduced, and the longer the irradiation time is, the greater the influence on the tensile strength property is.

Aa-1-1a, Aa-1-1b, Aa-1-1c (with addition of 3% rare earth material), Aa-1-2a, Aa-1-2b, Aa-1-2c (with addition of 6% rare earth material), Aa-1-3a, Aa-1-3b, Aa-1-3c (with addition of 9% rare earth material), Aa-2-1a, Aa-2-1b, Aa-2-1c (with addition of 3% rare earth material, ultraviolet irradiation 2000 hours), Aa-2-2a, Aa-2-2b, Aa-2-2c (with addition of 6% rare earth material, ultraviolet irradiation 2000 hours), Aa-2-3a, Aa-2-3b, comparison of Aa-2-3c (9% rare earth added, UV irradiation 2000 hours), Aa-3-1a, Aa-3-1b, Aa-3-1c (3% rare earth added, UV irradiation 4000 hours), Aa-3-2a, Aa-3-2b, Aa-3-2c (6% rare earth added, UV irradiation 4000 hours), Aa-3-3a, Aa-3-3b, Aa-3-3c (9% rare earth added, UV irradiation 4000 hours) with the data in comparative test group A revealed the following results.

Firstly, the tensile strength performance of the pipe is enhanced by adding the rare earth material, and the tensile strength performance of the pipe can be well improved no matter 3%, 6% or 9% is added.

Secondly, the ageing resistance of the pipeline is enhanced by adding the rare earth material, and if the rare earth material is not added, the tensile strength performance of the pipe is sharply reduced under ultraviolet irradiation. After the rare earth material is added, the tensile strength performance after 2000 hours or 4000 hours of ultraviolet irradiation is stronger than that of the pipe without the rare earth material.

Finally, as the amount added increases from 3% to 6% and then to 9%, the tensile strength properties and the aging resistance of the pipe are gradually enhanced.

Further, the anti-aging pipe 1 made of PVC is used as a test object for tensile test, namely, the anti-aging pipe is made of a polyvinyl chloride material and a polyvinyl chloride material which are used as pipe matrix materials, and the rare earth material is a rare earth salt material- $SrAl_2O_4$ Eu-2+ and Dy-3+ of the anti-aging pipe 1. In addition, the anti-aging pipe 1 is manufactured as a PVC yarn wrapping pipe. The reinforcing layer 20 of the anti-aging pipe 1 is a yarn material.

The testing process is substantially similar to that of the PU pipe and will not be described in detail herein. All tests are completed at normal room temperature of 25° C., the grain diameter of the rare earth material added in the experimental group can be 5-10 μm, and the test is added with rare earth with 7 μm specification. The PVC pipe is a braided pipe and has an inner diameter of 9 mm and an outer diameter of 14.5 mm.

The test results are shown in the following table, wherein test group B is a control group to which no anti-aging material was added, and wherein test group Bb is a test group to which an anti-aging material was added.

In comparative test group B, B-1-1a, B-1-2B, B-1-3c (non-UV-irradiated group), B-2-1a, B-2-2B, B-2-3c (UV-irradiated 2000-hour group), and B-3-1a, B-3-2B, B-3-3c (UV-irradiated 4000-hour group), it was found that UV rays had a large influence on the tensile strength of the pipe. The tensile strength effect of the pipe subjected to ultraviolet irradiation is significantly reduced, and the longer the irradiation time, the greater the effect on the tensile strength properties. The ultraviolet irradiation experiment was performed at an ultraviolet wavelength of approximately 350 nm. It is noted that the pipes with rare earth materials added have better aging resistance under the ultraviolet irradiation test of 250 nm-400 nm, and the ultraviolet ray with the wavelength of 350 nm is taken as an example.

Bb-1-1a, Bb-1-1b, Bb-1-1c (with 3% rare earth material added), Bb-1-2a, Bb-1-2b, Bb-1-2c (with 3% rare earth material added, with ultraviolet irradiation for 2000 hours), Bb-1-3a, Bb-1-3b, Bb-1-3c (with 3% rare earth material added, with ultraviolet irradiation for 4000 hours), Bb-2-1a, Bb-2-1b, Bb-2-1c (with 6% rare earth material added), Bb-2-2a, Bb-2-2b, Bb-2-2c (with 6% rare earth material added, with ultraviolet irradiation for 2000 hours), Bb-2-3a, Bb-2-3b, bb-2-3c (6% rare earth added, 4000 hours UV), Bb-3-1a, Bb-3-1B, Bb-3-1c (9% rare earth added), Bb-3-2a, Bb-3-2B, Bb-3-2c (9% rare earth added, 2000 hours UV), Bb-3-3a, Bb-3-3B, Bb-3-3c (9% rare earth added, 4000 hours UV) and comparative test group B, it can be concluded with the following conclusions.

Firstly, the tensile strength performance of the pipe is enhanced by adding the rare earth material, and the tensile strength performance of the pipe can be well improved no matter 3%, 6% or 9% is added.

And secondly, the ageing resistance of the pipeline is enhanced by adding the rare earth material, and if the rare earth material is not added, the tensile strength of the pipeline is sharply reduced under ultraviolet irradiation. After the rare earth material is added, the tensile strength performance after 2000 hours or 4000 hours of ultraviolet irradiation is stronger than that of the original pipe without the rare earth material.

Finally, the tensile strength and the ageing resistance of the pipe are gradually enhanced as the addition amount is increased from 6% to 9%, and the ageing resistance increased by 3% and 6% is similar.

Further, it is to be noted that the pipe matrix material of the anti-aging pipe 1 may be mixed with some auxiliary agents such as coloring agents, antioxidants, plasticizers, and the like. In addition, the transmittance of the anti-aging layer 10 of the anti-aging pipe 1 may range from 0% to 100%.

| Testing Group | sample number | sample QTY | hose structure & material | tension test result/kg | sample treatment |
|---|---|---|---|---|---|
| A | a-1-1 | 1 | single wall PU hose | 48.5 | No treatment |
|  | a-1-2 | 1 | single wall PU hose | 51.5 | No treatment |
|  | a-1-3 | 1 | single wall PU hose | 48.8 | No treatment |
|  | a-2-1 | 1 | single wall PU hose | 41.5 | UV-irradiated 2000 hours |
|  | a-2-2 | 1 | single wall PU hose | 39.6 | UV-irradiated 2000 hours |
|  | a-2-3 | 1 | single wall PU hose | 40.7 | UV-irradiated 2000 hours |
|  | a-3-1 | 1 | single wall PU hose | 25.4 | UV-irradiated 4000 hours |
|  | a-3-2 | 1 | single wall PU hose | 21.3 | UV-irradiated 4000 hours |
|  | a-3-3 | 1 | single wall PU hose | 26.9 | UV-irradiated 4000 hours |
| Aa | Aa-1-1a | 1 | single wall PU hose | 56.9 | with addition of 3% rare earth material (main composition: $SrAl_2O_4$ Eu-2+ and Dy-3+) |
|  | Aa-1-1b | 1 | single wall PU hose | 55.8 | with addition of 3% rare earth material (main composition: $SrAl_2O_4$ Eu-2+ and Dy-3+) |
|  | Aa-1-1c | 1 | single wall PU hose | 57 | with addition of 3% rare earth material (main composition: $SrAl_2O_4$ Eu-2+ and Dy-3+) |
|  | Aa-1-2a | 1 | single wall PU hose | 58.7 | with addition of 6% rare earth material (main composition: $SrAl_2O_4$ Eu-2+ and Dy-3+) |
|  | Aa-1-2b | 1 | single wall PU hose | 58.3 | with addition of 6% rare earth material (main composition: $SrAl_2O_4$ Eu-2+ and Dy-3+) |
|  | Aa-1-2c | 1 | single wall PU hose | 59 | with addition of 6% rare earth material (main composition: $SrAl_2O_4$ Eu-2+ and Dy-3+) |
|  | Aa-1-3a | 1 | single wall PU hose | 63 | with addition of 9% rare earth material (main composition: $SrAl_2O_4$ Eu-2+ and Dy-3+) |
|  | Aa-1-3b | 1 | single wall PU hose | 64.1 | with addition of 9% rare earth material (main composition: $SrAl_2O_4$ Eu-2+ and Dy-3+) |
|  | Aa-1-3c | 1 | single wall PU hose | 62.9 | with addition of 9% rare earth material (main composition: $SrAl_2O_4$ Eu-2+ and Dy-3+) |
|  | Aa-2-1a | 1 | single wall PU hose | 53.9 | 1. with addition of 3% rare earth material (main composition: $SrAl_2O_4$ Eu-2+ and Dy-3+) 2. UV-irradiated 2000 hours |
|  | Aa-2-1b | 1 | single wall PU hose | 52.8 | 1. with addition of 3% rare earth material (main composition: $SrAl_2O_4$ Eu-2+ and Dy-3+) 2. UV-irradiated 2000 hours |
|  | Aa-2-1c | 1 | single wall PU hose | 53.4 | 1. with addition of 3% rare earth material (main composition: $SrAl_2O_4$ Eu-2+ and Dy-3+) 2. UV-irradiated 2000 hours |
|  | Aa-2-2a | 1 | single wall PU hose) | 56.9 | 1. with addition of 6% rare earth material (main composition: $SrAl_2O_4$ Eu-2+ and Dy-3+) 2. UV-irradiated 2000 hours |
|  | Aa-2-2b | 1 | single wall PU hose | 57.1 | 1. with addition of 3% rare earth material (main composition: $SrAl_2O_4$ Eu-2+ and Dy-3+) 2. UV-irradiated 2000 hours |
|  | Aa-2-2c | 1 | single wall PU hose | 56.8 | 1. with addition of 3% rare earth material (main composition: $SrAl_2O_4$ Eu-2+ and Dy-3+) 2. UV-irradiated 2000 hours |
|  | Aa-2-3a | 1 | single wall PU hose | 59.38 | 1. with addition of 9% rare earth material (main composition: $SrAl_2O_4$ Eu- |

-continued

| Testing Group | sample number | sample QTY | hose structure & material | tension test result/kg | sample treatment |
|---|---|---|---|---|---|
| | | | | | 2+ and Dy-3+) 2. UV-irradiated 2000 hours |
| | Aa-2-3b | 1 | single wall PU hose | 59.6 | 1. with addition of 9% rare earth material (main composition: $SrAl_2O_4$ Eu-2+ and Dy-3+) 2. UV-irradiated 2000 hours |
| | Aa-2-3c | 1 | single wall PU hose | 58.8 | 1. with addition of 9% rare earth material (main composition: $SrAl_2O_4$ Eu-2+ and Dy-3+) 2. UV-irradiated 2000 hours |
| | Aa-3-1a | 1 | single wall PU hose | 42.4 | 1. with addition of 3% rare earth material (main composition: $SrAl_2O_4$ Eu-2+ and Dy-3+) 2. UV-irradiated 4000 hours |
| | Aa-3-1b | 1 | single wall PU hose | 40 | 1. with addition of 3% rare earth material (main composition: $SrAl_2O_4$ Eu-2+ and Dy-3+) 2. UV-irradiated 4000 hours |
| | Aa-3-1c | 1 | single wall PU hose | 41.9 | 1. with addition of 3% rare earth material (main composition: $SrAl_2O_4$ Eu-2+ and Dy-3+) 2. UV-irradiated 4000 hours |
| | Aa-3-2a | 1 | single wall PU hose | 45.5 | 1. with addition of 6% rare earth material (main composition: $SrAl_2O_4$ Eu-2+ and Dy-3+) 2. UV-irradiated 4000 hours |
| | Aa-3-2b | 1 | single wall PU hose | 47.1 | 1. with addition of 6% rare earth material (main composition: $SrAl_2O_4$ Eu-2+ and Dy-3+) 2. UV-irradiated 4000 hours |
| | Aa-3-2c | 1 | single wall PU hose | 45.9 | 1. with addition of 6% rare earth material (main composition: $SrAl_2O_4$ Eu-2+ and Dy-3+) 2. UV-irradiated 4000 hours |
| | Aa-3-3a | 1 | single wall PU hose | 48 | 1. with addition of 9% rare earth material (main composition: $SrAl_2O_4$ Eu-2+ and Dy-3+) 2. UV-irradiated 4000 hours |
| | Aa-3-3b | 1 | single wall PU hose | 47.6 | 1. with addition of 9% rare earth material (main composition: $SrAl_2O_4$ Eu-2+ and Dy-3+) 2. UV-irradiated 4000 hours |
| | Aa-3-3c | 1 | single wall PU hose | 47.4 | 1. with addition of 9% rare earth material (main composition: $SrAl_2O_4$ Eu-2+ and Dy-3+) 2. UV-irradiated 4000 hours |
| B | b-1-1a | 1 | PVC braided hose | 116 | No treatment |
| | b-1-2b | 1 | PVC braided hose | 124.58 | No treatment |
| | b-1-3c | 1 | PVC braided hose | 125.6 | No treatment |
| | b-2-1a | 1 | PVC braided hose | 110.4 | UV-irradiated 2000 hours |
| | b-2-2b | 1 | PVC braided hose | 108.7 | UV-irradiated 2000 hours |
| | b-2-3c | 1 | PVC braided hose | 106.8 | UV-irradiated 2000 hours |
| | b-3-1a | 1 | PVC braided hose | 98.5 | UV-irradiated 4000 hours |
| | b-3-2b | 1 | PVC braided hose | 97.1 | UV-irradiated 4000 hours |
| | b-3-3c | 1 | PVC braided hose | 100.5 | UV-irradiated 4000 hours |
| Bb | Bb-1-1a | 1 | PVC braided hose | 157.6 | with addition of 3% rare earth material (main composition: $SrAl_2O_4$ Eu-2+ and Dy-3+) |
| | Bb-1-1b | 1 | PVC braided hose | 165.4 | with addition of 3% rare earth material (main composition: $SrAl_2O_4$ Eu-2+ and Dy-3+) |
| | Bb-1-1c | 1 | PVC braided hose | 158.9 | with addition of 3% rare earth material (main |

-continued

| Testing Group | sample number | sample QTY | hose structure & material | tension test result/kg | sample treatment |
|---|---|---|---|---|---|
| | | | | | composition: $SrAl_2O_4$ Eu-2+ and Dy-3+) |
| | Bb-1-2a | 1 | PVC braided hose | 150.5 | with addition of 6% rare earth material (main composition: $SrAl_2O_4$ Eu-2+ and Dy-3+) |
| | Bb-1-2b | 1 | PVC braided hose | 152.9 | with addition of 6% rare earth material (main composition: $SrAl_2O_4$ Eu-2+ and Dy-3+) |
| | Bb-1-2c | 1 | PVC braided hose | 148.7 | with addition of 6% rare earth material (main composition: $SrAl_2O_4$ Eu-2+ and Dy-3+) |
| | Bb-1-3a | 1 | PVC braided hose | 120.5 | with addition of 9% rare earth material (main composition: $SrAl_2O_4$ Eu-2+ and Dy-3+) |
| | Bb-1-3b | 1 | PVC braided hose | 122.3 | with addition of 9% rare earth material (main composition: $SrAl_2O_4$ Eu-2+ and Dy-3+) |
| | Bb-1-3c | 1 | PVC braided hose | 120 | with addition of 9% rare earth material (main composition: $SrAl_2O_4$ Eu-2+ and Dy-3+) |
| | Bb-2-1a | 1 | PVC braided hose | 167 | 1. with addition of 3% rare earth material (main composition: $SrAl_2O_4$ Eu-2+ and Dy-3+) 2. UV-irradiated 2000 hours |
| | Bb-2-1b | 1 | PVC braided hose | 165.3 | 1. with addition of 3% rare earth material (main composition: $SrAl_2O_4$ Eu-2+ and Dy-3+) 2. UV-irradiated 2000 hours |
| | Bb-2-1c | 1 | PVC braided hose | 169.4 | 1. with addition of 3% rare earth material (main composition: $SrAl_2O_4$ Eu-2+ and Dy-3+) 2. UV-irradiated 2000 hours |
| | Bb-2-2a | 1 | PVC braided hose | 150.5 | 1. with addition of 6% rare earth material (main composition: $SrAl_2O_4$ Eu-2+ and Dy-3+) 2. UV-irradiated 2000 hours |
| | Bb-2-2b | 1 | PVC braided hose | 152.9 | 1. with addition of 3% rare earth material (main composition: $SrAl_2O_4$ Eu-2+ and Dy-3+) 2. UV-irradiated 2000 hours |
| | Bb-2-2c | 1 | PVC braided hose | 149.5 | 1. with addition of 3% rare earth material (main composition: $SrAl_2O_4$ Eu-2+ and Dy-3+) 2. UV-irradiated 2000 hours |
| | Bb-2-3a | 1 | PVC braided hose | 119.5 | 1. with addition of 9% rare earth material (main composition: $SrAl_2O_4$ Eu-2+ and Dy-3+) 2. UV-irradiated 2000 hours |
| | Bb-2-3b | 1 | PVC braided hose | 117.6 | 1. with addition of 9% rare earth material (main composition: $SrAl_2O_4$ Eu-2+ and Dy-3+) 2. UV-irradiated 2000 hours |
| | Bb-2-3c | 1 | PVC braided hose | 114.8 | 1. with addition of 9% rare earth material (main composition: $SrAl_2O_4$ Eu-2+ and Dy-3+) 2. UV-irradiated 2000 hours |
| | Bb-3-1a | 1 | PVC braided hose | 176 | 1. with addition of 3% rare earth material (main composition: $SrAl_2O_4$ Eu-2+ and Dy-3+) 2. UV-irradiated 4000 hours |

-continued

| Testing Group | sample number | sample QTY | hose structure & material | tension test result/kg | sample treatment |
|---|---|---|---|---|---|
| | Bb-3-1b | 1 | PVC braided hose | 175.2 | 1. with addition of 3% rare earth material (main composition: $SrAl_2O_4$ Eu-2+ and Dy-3+) 2. UV-irradiated 4000 hours |
| | Bb-3-1c | 1 | PVC braided hose | 178 | 1. with addition of 3% rare earth material (main composition: $SrAl_2O_4$ Eu-2+ and Dy-3+) 2. UV-irradiated 4000 hours |
| | Bb-3-2a | 1 | PVC braided hose | 164.5 | 1. with addition of 6% rare earth material (main composition: $SrAl_2O_4$ Eu-2+ and Dy-3+) 2. UV-irradiated 4000 hours |
| | Bb-3-2b | 1 | PVC braided hose | 163.6 | 1. with addition of 6% rare earth material (main composition: $SrAl_2O_4$ Eu-2+ and Dy-3+) 2. UV-irradiated 4000 hours |
| | Bb-3-2c | 1 | PVC braided hose | 159.4 | 1. with addition of 6% rare earth material (main composition: $SrAl_2O_4$ Eu-2+ and Dy-3+) 2. UV-irradiated 4000 hours |
| | Bb-3-3a | 1 | PVC braided hose | 126.5 | 1. with addition of 9% rare earth material (main composition: $SrAl_2O_4$ Eu-2+ and Dy-3+) 2. UV-irradiated 4000 hours |
| | Bb-3-3b | 1 | PVC braided hose | 125.9 | 1. with addition of 9% rare earth material (main composition: $SrAl_2O_4$ Eu-2+ and Dy-3+) 2. UV-irradiated 4000 hours |
| | Bb-3-3c | 1 | PVC braided hose | 127 | 1. with addition of 9% rare earth material (main composition: $SrAl_2O_4$ Eu-2+ and Dy-3+) 2. UV-irradiated 4000 hours |

Further, the anti-aging pipe 1 made of PU is used as a test object for carrying out blasting test, namely, the anti-aging pipe is made of polyurethane material and polyurethane material as pipe matrix material, and the rare earth material is rare earth salt material-$SrAl_2O_4$ Eu-2+ and Dy-3+ of the anti-aging pipe 1.

The test procedure is roughly as follows: three sections of 45 cm-long test articles are prepared for each sample, then copper connectors are arranged at two ends of the test article of the pipe, a plug is arranged at one end, and the other end is connected with a high-pressure (water pressure) tester. Then slowly increasing the pressure, and closing the valve after the air in the pipe is exhausted. The pressure was increased at a rate of about 70 bar/min until the pipe burst and the burst pressure was recorded. All tests were done at normal room temperature 25° C., the particle size of the rare earth material added in the experimental group could be 5-10 μm, 7 μm was added in this test. The PU pipe had a single-layer structure, and had an inner diameter of 6.35 mm and an outer diameter of 8.35 mm.

The test results are shown in the following table, in which test group C is a control group to which no anti-aging material is added, and test group Cc is an experimental group to which an anti-aging material is added.

The comparative test group C, C-1-1, C-1-2, C-1-3 (non-UV-irradiated group), C-2-1, C-2-2, C-2-3 (UV-irradiated 2000-hour group), and C-3-1, C-3-2, C-3-3 (UV-irradiated 4000-hour group) showed that the UV-rays had a large effect on the strength of the pipe. The intensity effect of the pipe subjected to ultraviolet irradiation is significantly reduced, and the longer the irradiation time is, the greater the effect on the intensity performance is.

Cc-1-1a, Cc-1-1b, Cc-1-1c (with 3% rare earth added), Cc-1-2a, Cc-1-2b, Cc-1-2c (with 6% rare earth added), Cc-1-3a, Cc-1-3b, Cc-1-3c (with 9% rare earth added), Cc-2-1a, Cc-2-1b, Cc-2-1c (with 3% rare earth added, for 2000 hours of ultraviolet irradiation), Cc-2-2a, Cc-2-2b, Cc-2-2c (with 6% rare earth added, for 2000 hours of ultraviolet irradiation), Cc-2-3a, Cc-2-3b, Cc-2-3C (9% rare earth added, UV irradiation 2000 hours), Cc-3-1a, Cc-3-1b, Cc-3-1C (3% rare earth added, UV irradiation 4000 hours), Cc-3-2a, Cc-3-2b, Cc-3-2C (6% rare earth added, UV irradiation 4000 hours), Cc-3-3a, Cc-3-3b, Cc-3-3C (9% rare earth added, UV irradiation 4000 hours) and comparative test set C, it can be concluded with the following conclusions.

Firstly, the addition of rare earth materials enhances the compressive strength performance of the pipeline, and the strength performance of the pipe can be well improved no matter 3%, 6% or 9% of the rare earth materials are added. When the amount of the rare earth added is 9%, the burst strength performance is improved by 50% relative to the state of no addition.

Secondly, the ageing resistance of the pipeline is enhanced by adding the rare earth material, and if the rare earth material is not added, the compressive strength of the pipe is sharply reduced under ultraviolet irradiation. After the rare earth material is added, the compressive strength performance after 2000 hours or 4000 hours of ultraviolet irradiation is stronger than that of the original pipe without the rare earth material.

Finally, as the amount added increases from 3% to 6% and then to 9%, the compressive strength properties and the anti-aging properties of the pipe are gradually enhanced.

Furthermore, the anti-aging pipe 1 made of PVC is taken as a test object for blasting test, namely the pipe is made of polyvinyl chloride material and polyvinyl chloride material which are taken as pipe matrix materials, and the rare earth material is rare earth material-$SrAl_2O_4$ Eu-2+ and Dy-3+ of the anti-aging pipe 1. The anti-aging pipe 1 is manufactured as a PVC yarn-covered pipe. The reinforcing layer 20 of the anti-aging pipe 1 is a yarn material.

The testing process is substantially similar to the above-mentioned PU pipe, and reference is made to the above description, which is not repeated herein. The testing process is substantially similar to that of the PU pipe and will not be described in detail herein. All tests are completed at normal room temperature of 25° C., the particle size of the rare earth material added in the experimental group can be 1-50 μm, and the rare earth with the specification of 7 μm is added in the test. The PVC pipe is a braided pipe and has an inner diameter of 9 mm and an outer diameter of 14.5 mm.

The test results are shown in the following table, wherein test group D is a control group to which no anti-aging material was added, and wherein test group Dd is a test group to which an anti-aging material was added.

In comparative test group D, D-1-1a, D-1-1b, D-1-1c (non-UV-irradiated group), D-2-1a, D-2-1b, D-2-1c (UV-irradiated 2000-hour group), and b-3-1a, b-3-1b, b-3-1c (UV-irradiated 4000-hour group) were found to have a large influence of UV rays on the intensity of the pipe. The influence of the intensity of the pipe subjected to the ultraviolet irradiation is remarkably reduced, and the longer the irradiation time is, the larger the influence on the intensity property is.

Dd-1-1a, Dd-1-1b, Dd-1-1c (with 3% rare earth material added), Dd-1-2a, Dd-1-2b, Dd-1-2c (with 3% rare earth material added, ultraviolet irradiation 2000 hours), Dd-1-3a, Dd-1-3b, Dd-1-3c (with 3% rare earth material added, ultraviolet irradiation 4000 hours), Dd-2-1a, Dd-2-1b, Dd-2-1c (with 6% rare earth material added), Dd-2-2a, Dd-2-2b, Dd-2-2c (with 6% rare earth material added, ultraviolet irradiation 2000 hours), Dd-2-3a, Dd-2-3b, comparison of Dd-2-3c (6% rare earth added, 4000 hours UV irradiation), Dd-3-1a, Dd-3-1b, Dd-3-1c (9% rare earth added), Dd-3-2a, Dd-3-2b, Dd-3-2c (9% rare earth added, 2000 hours UV irradiation), Dd-3-3a, Dd-3-3b, Dd-3-3c (9% rare earth added, 4000 hours UV irradiation) with the data in comparative test group D, it can be concluded with the following conclusions.

Firstly, the addition of rare earth materials enhances the compressive strength performance of the pipeline, and the strength performance of the pipe can be well improved no matter 3%, 6% or 9% of the rare earth materials are added. When the amount of the added rare earth is 9%, the burst strength performance is improved by 50% relative to the state of no addition.

And secondly, the ageing resistance of the pipeline is enhanced by adding the rare earth material, and if the rare earth material is not added, the compressive strength of the pipe is sharply reduced under ultraviolet irradiation. After the rare earth material is added, the compression strength performance after 2000 hours or 4000 hours of ultraviolet irradiation is stronger than that of the original pipe without the rare earth material.

Finally, as the amount added increases from 3% to 6% and then to 9%, the compressive strength properties and the anti-aging properties of the pipe are gradually enhanced.

Figure 2A:
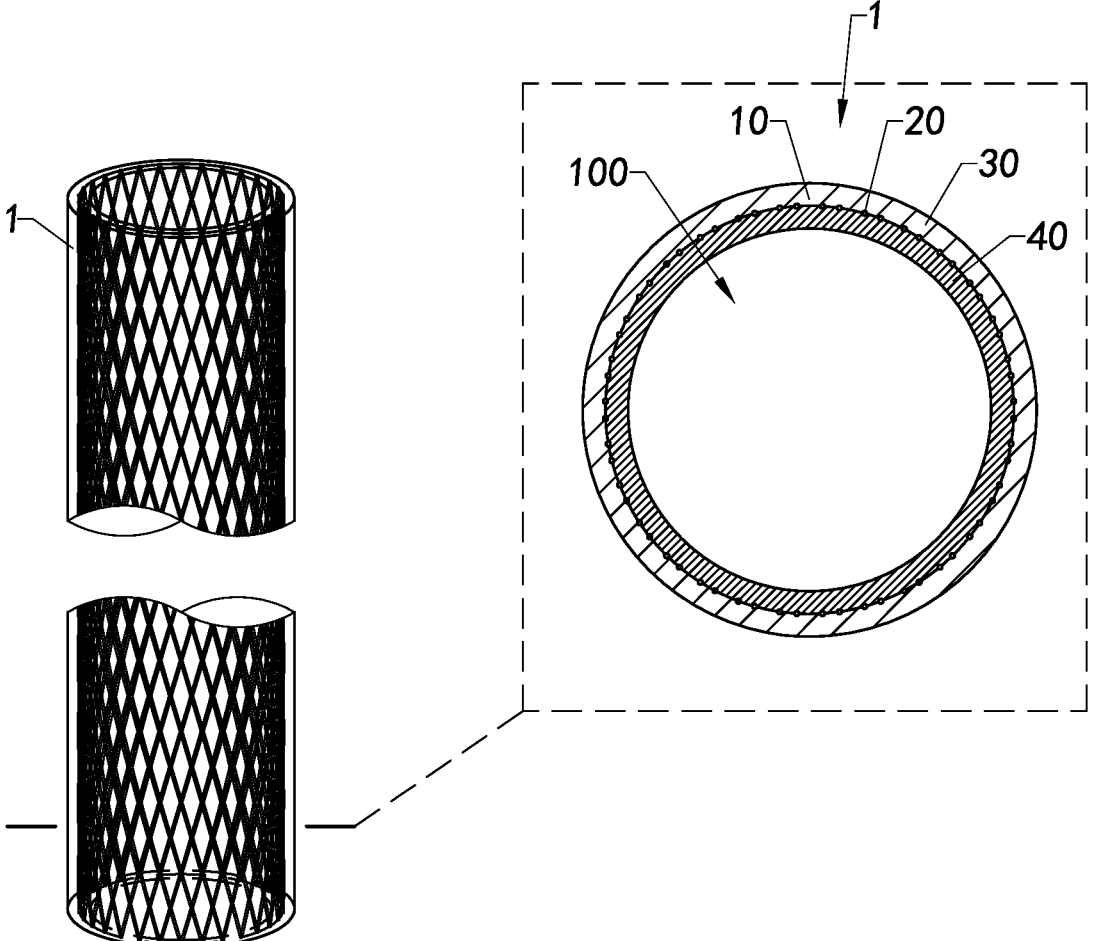
FIG. 2A is a schematic view of the anti-aging pipe according to an alternative mode of the above preferred embodiment of the present invention.

Further, referring to FIG. 2A, an anti-aging pipe 1 according to another alternative mode of the present invention is illustrated.

In the present embodiment, the anti-aging pipe 1 includes an outer hose 30, an inner hose 40, and the reinforcing layer 20, wherein the outer hose 30 is sleeved on the inner hose 40, the inner hose 40 surrounds to form the transmission channel 100, and the anti-aging layer 10 forms the outer hose 30.

The outer hose 30, the inner hose 40 and the reinforcing layer 20 may be manufactured separately, the reinforcing layer 20 is coated on the outer wall of the inner hose 40, and the outer hose 30 is coupled to the inner hose 40 and coated on the reinforcing layer 20. In other words, the outer hose 30 and the inner hose 40 of the anti-aging pipe 1 are layered.

The outer hose 30 and the inner hose 40 may be made of the same material or different materials. In the present embodiment, the outer hose 30 is made of an anti-aging material, and the inner hose 40 is made of a general pipe matrix material. For example, the outer hose 30 is made of PVC material plus rare earth material, and the inner hose 40 is made of PVC material. The outer hose 30 is provided outside the material of the inner hose 40, and can protect the inner hose 40, so that the requirement for the aging resistance of the inner hose 40 can be reduced, and thus the inner hose 40 can be manufactured using a common material.

Figure 2B:
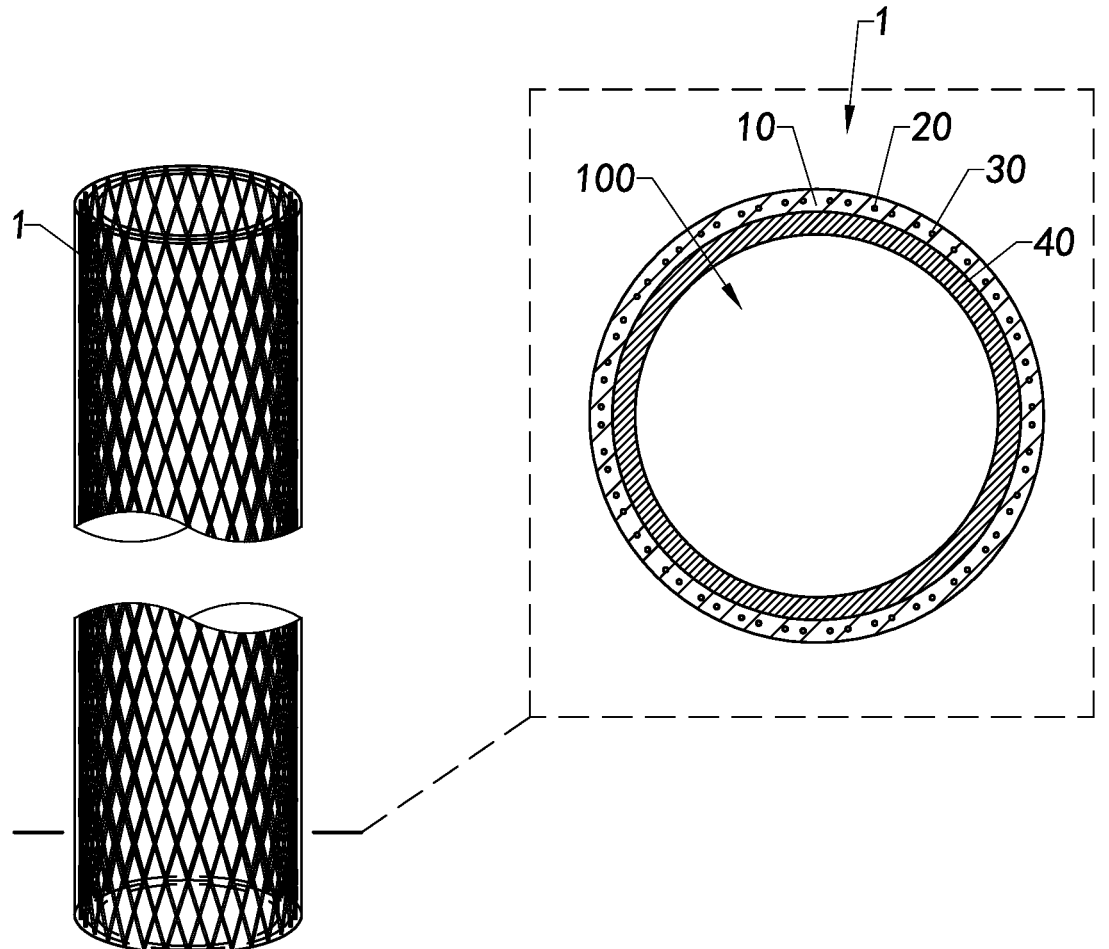
FIG. 2B is a schematic view of the anti-aging pipe according to another alternative mode of the above preferred embodiment of the present invention.

Referring to FIG. 2B, an anti-aging pipe 1 according to another alternative mode of the present invention is illustrated.

In the present embodiment, the anti-aging pipe 1 includes the outer hose 30, the inner hose 40, and the reinforcing layer 20, the outer hose 30 and the reinforcing layer 20 are integrally molded, the outer hose 30 is integrally wrapped around the reinforcing layer 20, and the outer hose 30 is sleeved on the inner hose 40.

Figure 2C:
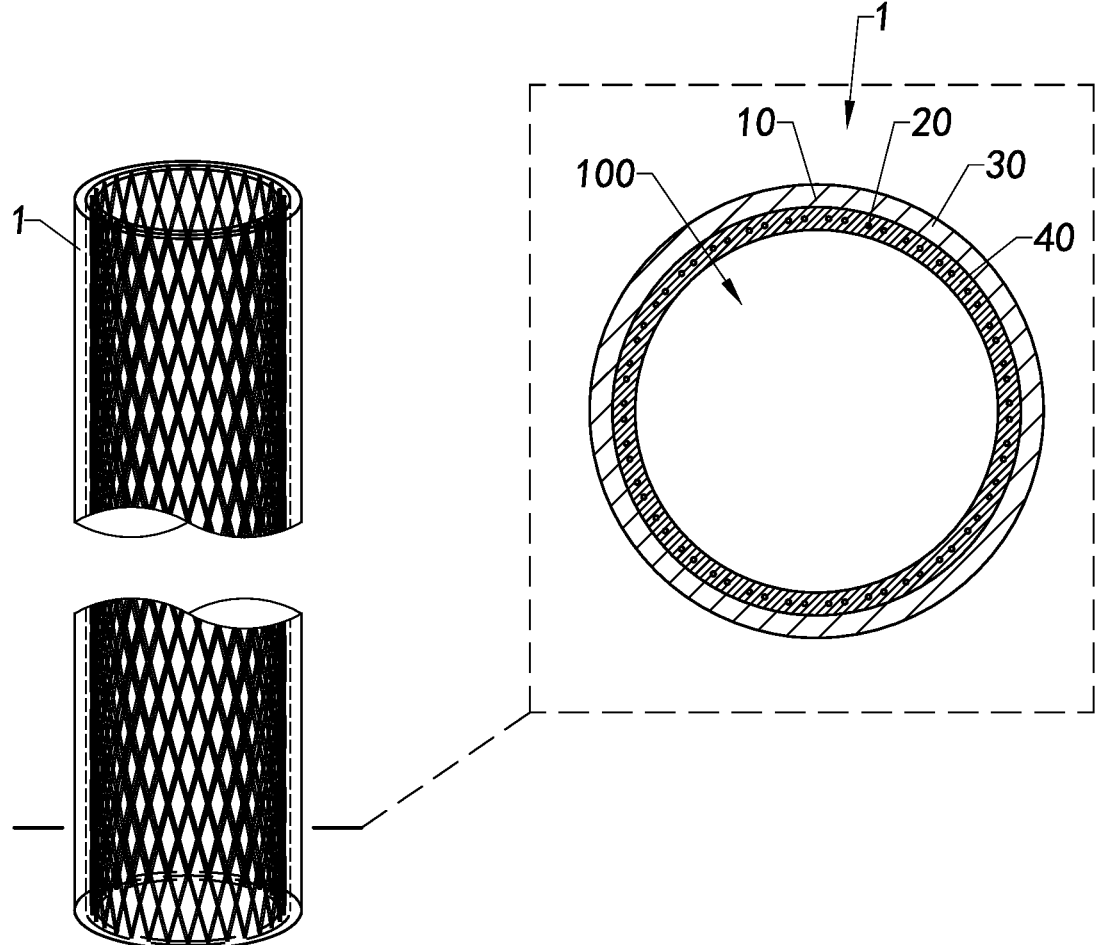
FIG. 2C is a schematic view of the anti-aging pipe according to another alterantive mode of the above preferred embodiment of the present invention.

Referring to FIG. 2C, an anti-aging pipe 1 according to another alternative mode of the present invention is illustrated.

In the present embodiment, the anti-aging pipe 1 includes the outer hose 30, the inner hose 40, and the reinforcing layer 20, the inner hose 40 and the reinforcing layer 20 are integrally molded, the inner hose 40 is integrally wrapped around the reinforcing layer 20, and the outer hose 30 is fitted to the inner hose 40. The anti-aging layer 10 forms the outer hose 30.

Figure 4:
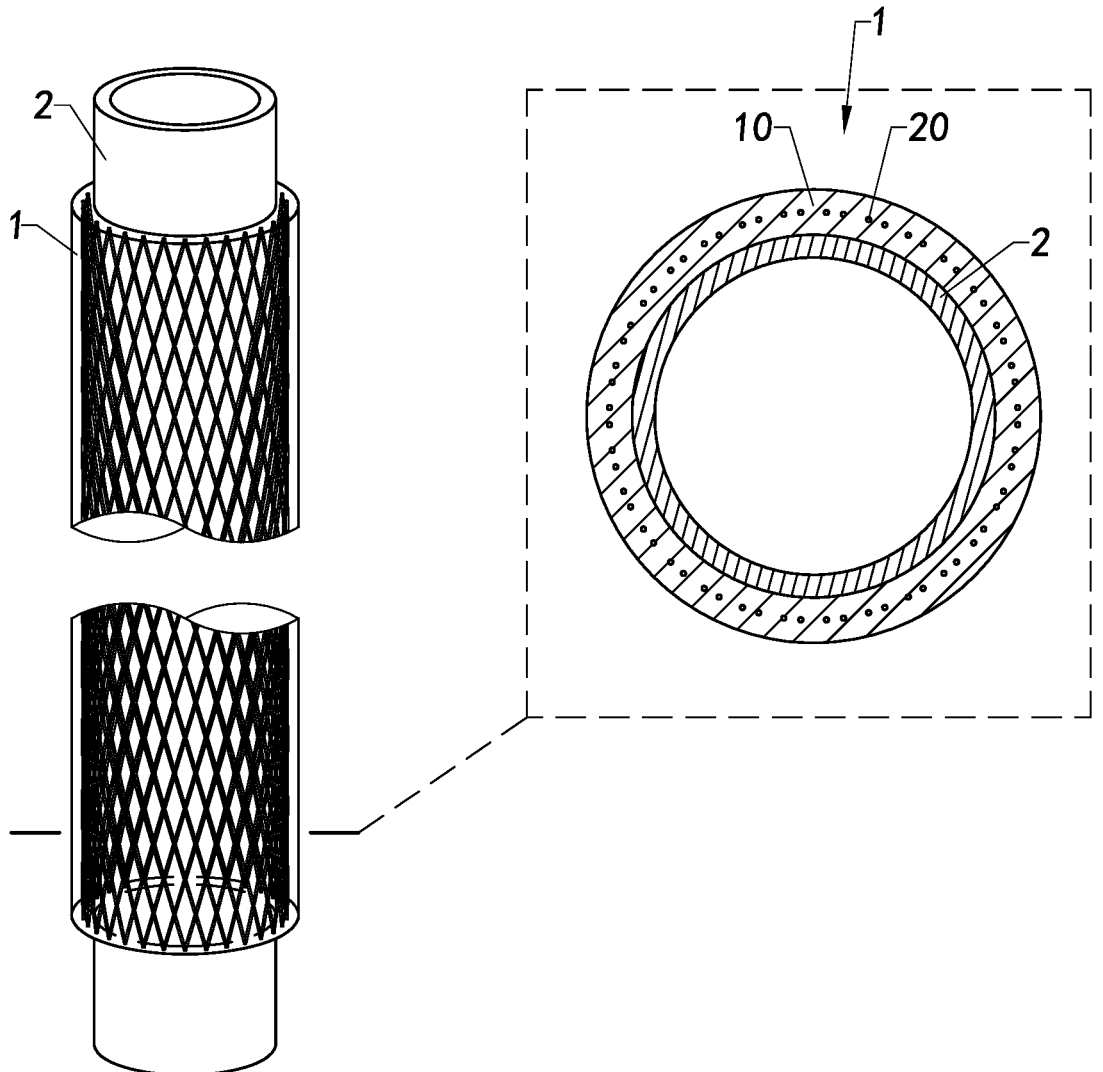
FIG. 4 is a schematic view illustrating the application of the anti-aging pipe according to the above preferred embodiment of the present invention.

Referring to FIG. 4, an application mode of the anti-aging pipe 1 is illustrated. The anti-aging pipe 1 can be used as an independent pipeline, can also be used as a protective shell, and is sleeved on other pipes 2 which need to be protected and have poor anti-aging performance. The thickness of the anti-aging pipe 1 can be less than 1 cm, and can also be more than 1 cm.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. An anti-aging pipe having a single hose structure comprising an outer hose wall, an inner hose wall, and a transmission channel defined by the inner hose wall;

wherein the single hose structure comprises an anti-aging pipe material and a reinforcing material; wherein the anti-aging pipe material comprises a mixture of a pipe matrix material and a rare earth material, the rare earth material provided in a positive mass ratio of up to 40% of the mixture; and wherein the reinforcing material has a net structure and is integrated within the anti-aging pipe material, so as not to be present on the outer hose wall and the inner hose wall.

2. The anti-aging pipe, as recited in claim 1, wherein the anti-aging pipe is a flexible pipe.

3. The anti-aging pipe, as recited in claim 1, wherein the pipe matrix material comprises a polyvinyl chloride material or a polyurethane material.

4. The anti-aging pipe, as recited in claim 1, wherein the anti-aging material further comprises a UV protective material mixed with the pipe matrix material and the rare earth material, wherein the UV protective material is a rare earth salt material $SrAl_2O_4$ Eu-2+ and Dy-3+.

5. The anti-aging pipe, as recited in claim 1, wherein the rare earth material has a particle size of 1 μm to 50 μm and is selected from the group consisting of rare earth oxides, rare earth elements, rare earth salts, and mixtures thereof; and wherein the pipe matrix material is selected from the group consisting of polyamide, polyamide fiber, polyvinyl chloride, polyurethane, ethylene propylene diene monomer, acrylonitrile butadiene copolymer, neoprene, cross-linked polyethylene, ultra high molecular weight polyethylene, polyethylene, acrylonitrile-butadiene-styrene copolymer, unplasticized polyvinyl chloride, post chlorinated polyvinyl chloride, polypropylene, and polyvinylidene fluoride.

6. The anti-aging pipe, as recited in claim 1, wherein the rare earth material comprises a rare earth oxide material selected from the group consisting of $Dy_2O_3$, $Er_2O_3$, $Nd_2O_3$, $Y_2O_3$, $Eu_2O_3$, $Ce_{0.67}Tb_{0.33}Al_{11}O_{19}$, $CeMgAl_{11}O_{19}$, $LaPO_4$, and $Y_2SiO_5$.

7. An anti-aging pipe having a multi-hose structure comprising an outer hose having an outer hose wall and an inner hose wall, an inner hose having an outer hose wall and an inner hose wall, and a transmission channel defined by the inner hose wall of the inner hose;

wherein the outer hose comprises an anti-aging pipe material comprising a mixture of a pipe matrix material and a rare earth material, the rare earth material provided in a positive mass ratio of up to 40% of the mixture;

wherein the inner hose comprises a pipe matrix material that does not include a rare earth material;

wherein the outer hose or the inner hose further comprises a reinforcing material; and wherein: the reinforcing material has a net structure and is integrated within the anti-aging pipe material of the outer hose, so as not to be present on the outer hose wall and the inner hose wall of the outer hose; or the reinforcing material has a net structure and is integrated within the pipe matrix material of the inner hose, so as not to be present on the outer hose wall and the inner hose wall of the inner hose.

8. The anti-aging pipe, as recited in claim 2, wherein the reinforcing material has a net structure and is integrated within the pipe matrix material of the inner hose, so as not to be present on the outer hose wall and the inner hose wall of the inner hose.

9. The anti-aging pipe, as recited in claim 2, wherein the reinforcing material has a net structure and is integrated within the anti-aging pipe material of the outer hose, so as not to be present on the outer hose wall and the inner hose wall of the outer hose.

10. The anti-aging pipe, as recited in claim 7, wherein the anti-aging pipe is a flexible pipe.

11. The anti-aging pipe, as recited in claim 7, wherein at least one of the pipe matrix material present in the anti-aging pipe material of the outer hose and the pipe matrix material of the inner hose comprises a polyvinyl chloride material or a polyurethane material.

12. The anti-aging pipe, as recited in claim 7, wherein the anti-aging material further comprises a UV protective material mixed with the pipe matrix material and the rare earth material, wherein the UV protective material is a rare earth salt material $SrAl_2O_4$ Eu-2+ and Dy-3+.

13. The anti-aging pipe, as recited in claim 7, wherein the rare earth material has a particle size of 1 μm to 50 μm and is selected from the group consisting of rare earth oxides, rare earth elements, rare earth salts, and mixtures thereof; and wherein the pipe matrix material is selected from the group consisting of polyamide, polyamide fiber, polyvinyl chloride, polyurethane, ethylene propylene diene monomer, acrylonitrile butadiene copolymer, neoprene, cross-linked polyethylene, ultra high molecular weight polyethylene, polyethylene, acrylonitrile-butadiene-styrene copolymer, unplasticized polyvinyl chloride, post chlorinated polyvinyl chloride, polypropylene, and polyvinylidene fluoride.

14. The anti-aging pipe, as recited in claim 7, wherein the rare earth material comprises a rare earth oxide material selected from the group consisting of $Dy_2O_3$, $Er_2O_3$, $Nd_2O_3$, $Y_2O_3$, $Eu_2O_3$, $Ce_{0.67}Tb_{0.33}Al_{11}O_{19}$, $CeMgAl_{11}O_{19}$, $LaPO_4$, and $Y_2SiO_5$.

\* \* \* \* \*